United States Patent

Warnke

[11] Patent Number: 5,230,660
[45] Date of Patent: Jul. 27, 1993

[54] BOOT ASSEMBLY FOR CONSTANT VELOCITY UNIVERSAL JOINT

[75] Inventor: James W. Warnke, Toledo, Ohio
[73] Assignee: Dana Corporation, Toledo, Ohio
[21] Appl. No.: 753,754
[22] Filed: Sep. 3, 1991
[51] Int. Cl.5 .................. F16D 3/227; F16D 3/84
[52] U.S. Cl. .................................. 464/146; 277/182; 277/189; 277/212 FB; 403/51; 403/134; 464/173; 464/906
[58] Field of Search ............... 464/173, 175, 901, 905, 464/906, 139-146; 277/181, 182, 189, 212 FB; 403/50, 51, 134

[56] References Cited

U.S. PATENT DOCUMENTS

| | | | |
|---|---|---|---|
| 1,871,883 | 8/1932 | Geyer | 464/173 |
| 2,426,701 | 9/1947 | Miller, Jr. | 464/173 |
| 2,510,362 | 6/1950 | Anderson | 464/175 |
| 2,926,510 | 3/1960 | De Lorean | 464/175 X |
| 2,929,232 | 3/1960 | Muller | |
| 3,021,157 | 2/1962 | Moskovitz | 464/134 |
| 3,322,445 | 5/1967 | Hassan | 403/51 |
| 3,830,083 | 8/1974 | Hadick et al. | 464/175 |
| 3,842,621 | 10/1974 | Mazziotti | 464/171 |
| 3,858,412 | 1/1975 | Fisher et al. | 464/146 |
| 4,319,467 | 3/1982 | Hegler et al. | 464/173 |
| 4,369,979 | 1/1983 | Krude et al. | 464/175 X |
| 4,403,781 | 9/1983 | Riemscheid | 464/175 X |
| 4,767,381 | 8/1988 | Brown et al. | 464/146 |
| 4,795,404 | 1/1989 | Sutton et al. | 464/905 X |
| 4,813,808 | 3/1989 | Gehrke | 403/326 |
| 4,946,303 | 8/1990 | Sawicki | 277/212 FB X |
| 5,026,323 | 6/1991 | Fukumura et al. | 464/175 |
| 5,062,821 | 11/1991 | Moulinet | 464/905 X |

FOREIGN PATENT DOCUMENTS 1130669 10/1968 United Kingdom .

Primary Examiner—Daniel P. Stodola
Assistant Examiner—William G. Battista, Jr.
Attorney, Agent, or Firm—Dykema Gossett

[57] ABSTRACT

A unique boot retainer for use in a constant velocity universal joint includes a plurality of circumferentially spaced radially inwardly extending resilient tabs. The tabs snap into a groove at an outer peripheral surface of an outer race to provide a positive abutment, properly positioning the retainer and the boot relative to the outer race. The unique construction simplifies assembly of the boot and retainer to the outer race.

16 Claims, 3 Drawing Sheets

BOOT ASSEMBLY FOR CONSTANT VELOCITY UNIVERSAL JOINT

BACKGROUND OF THE INVENTION

This invention relates to an improved sealing boot and boot retainer for use in a constant velocity universal joint.

One known type of constant velocity universal joint has a first shaft rotating with an inner race, and a second shaft rotating with an outer race. A plurality of balls transmit rotation between the inner and outer races. A flexible sealing member, or boot, is attached between the first shaft and the outer race to seal the area between the two. A boot can, or retainer, formed of a more rigid material than the boot is attached to the outer race and protects the boot.

In one prior art assembly, the boot surrounds an outer peripheral surface of the outer race, and a retainer is positioned radially outwardly of the boot. The retainer has a radially inwardly extending cylindrical lip at a position axially beyond the end of the boot which extends into a cylindrical notch in the outer race.

In another prior art assembly, a cylindrical rib extends radially inwardly from an inner peripheral surface of the boot, and is disposed in a cylindrical groove in the outer periphery of the outer race. A retainer is positioned radially outwardly of the boot, and a band is positioned over the retainer to secure the retainer and boot on the outer race.

The above-mentioned prior art assemblies are somewhat complicated to assemble.

SUMMARY OF THE INVENTION

In a disclosed embodiment, a constant velocity universal joint includes a first shaft which rotates with an inner race and a second shaft which rotates with an outer race. A first end of a flexible boot is secured to the first shaft, and the second end of the boot is secured at a desired position relative to the outer race by a relatively rigid retainer. The retainer has a plurality of circumferentially spaced, resilient tabs extending radially inwardly from an inner peripheral surface into a cylindrical groove in the outer periphery of the outer race. The boot and retainer may be assembled to the outer race by merely pushing the retainer onto one axial end of the outer race until the tabs snap into the groove. The assembly of the retainer and boot to the outer race is thus relatively simple. The groove and tabs define a positive stop for the retainer, such that the retainer and boot are secured at a desired axial position relative to the outer race. Further, the tabs prevent inadvertent removal or misalignment of the retainer.

Several embodiments are disclosed. In one embodiment the boot is attached to an end of the retainer removed from the outer race. In other embodiments, the boot is positioned radially between the outer race and the retainer.

These and other features of the present invention can be best understood from the following specification and drawings, of which the following is a brief description.

DETAILED DESCRIPTION OF PREFERRED EMBODIMENTS

Figure 1:
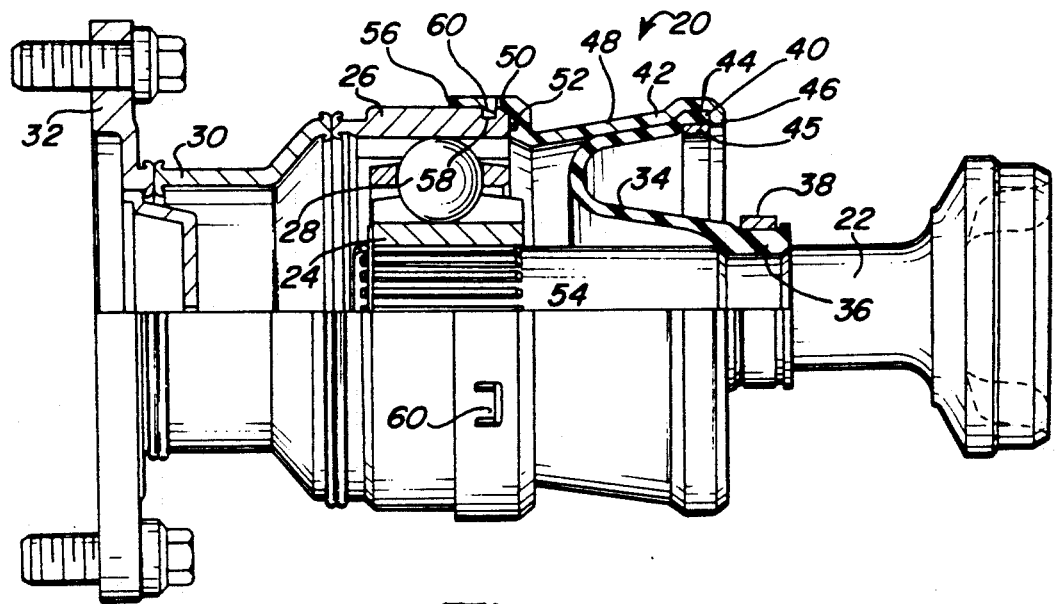
FIG. 1 is a partially cross-sectional view of a first embodiment of the present invention.

A constant velocity universal joint 20 is illustrated in FIG. 1 having a first shaft 22 rotatably secured with an inner race 24. An outer race 26 is disposed radially outwardly of a plurality of balls 28 which transmit rotation between inner race 24 and outer race 26. A member 30 connects outer race 26 to a shaft coupling 32. The structure of inner race 24, balls 28, shaft 22 and shaft coupling 32 are all well known in the art, and form no part of this invention.

A flexible boot 34 has a radially inner end 36 secured to shaft 22 by a clamp 38. A radially outer end 40 of boot 34 is secured to a rigid retainer 42 within a cylindrical notch 44. Cylindrical notch 44 is generally U-shaped in cross-section, and has a radially inwardly extending outer end 46. A ring 45 is forced into an inner peripheral surface of radially outer end 40 to secure boot 34 within cylindrical notch 44.

Retainer 42 includes a conically inwardly tapered section 48 extending from cylindrical notch 44 towards outer race 26. A stop face 50 on retainer 42 abuts a race end face 54. A seal 52 is disposed in stop face 50 to provide a fluid tight connection between outer race 56 and retainer 42.

An axially inner end 56 of retainer 42 is force fit on a radially outer peripheral surface of outer race 26. A groove 58 is formed at the outer peripheral surface of outer race 26. A plurality of circumferentially spaced resilient tabs 60 extend radially inwardly from an inner peripheral surface of retainer 42 and are received in groove 58. Tabs 60 are ramped radially inwardly in a direction moving towards outer end 46. The ramped surfaces of tabs 60 facilitates the insertion of retainer 42 onto outer race 26.

Figure 2:
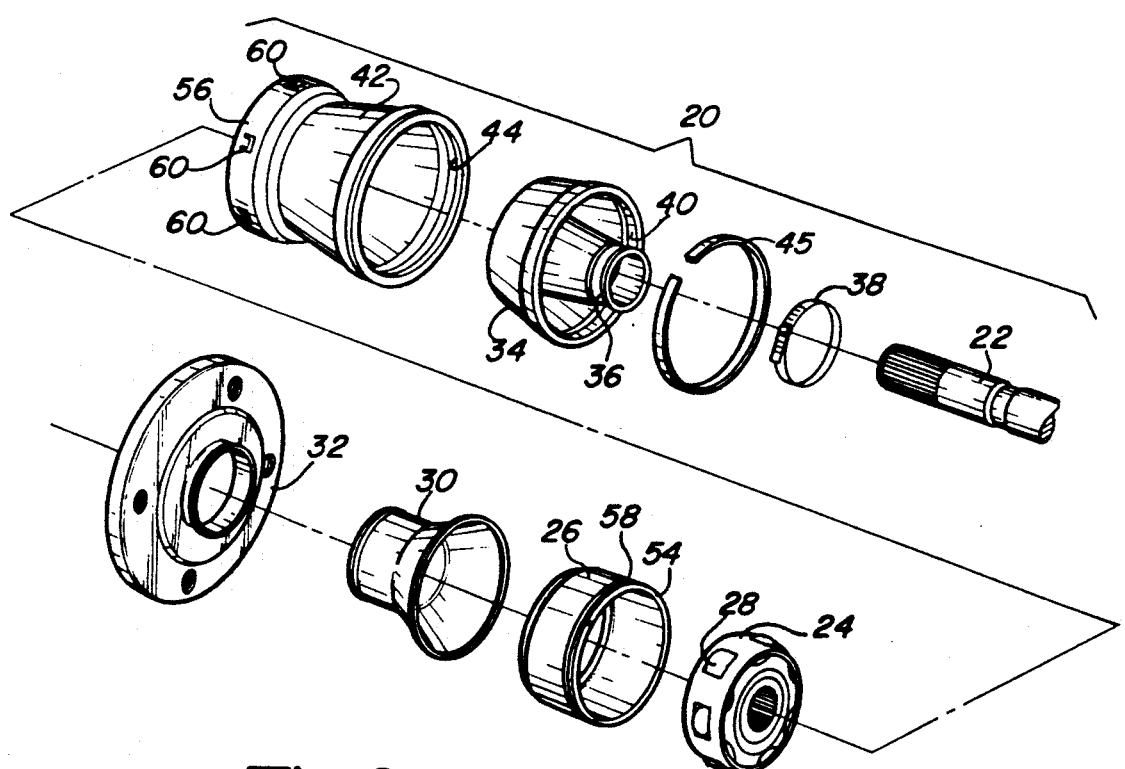
FIG. 2 is an assembly view of the embodiment illustrated in FIG. 1.

FIG. 2 shows further details of the various member which make up the first embodiment 20. Groove 58 extends around the entire outer circumference of outer race 26. Cylindrical notch 44 extends around the entire inner circumference of retainer 42, and radially outer end 40 extends around the entire outer circumference of boot 34.

In assembling first embodiment 20, the radially outer end 40 of boot 34 is placed within cylindrical notch 44 of retainer 42. Ring 45 is then press fit into the inner peripheral surface of radially outer end 40 to secure it within notch 44. Radially inner end 36 of boot 34 is connected to shaft 22 by clamp 28. Retainer 42 is force fit onto the end of outer race 26, with tabs 60 snapping into groove 58 to define a desired position for retainer 42. Since retainer 42 is rigid, the radially outer end 40 of boot is secured at a desired position relative to outer race 26. Removal of retainer 42 from outer race 26 is prevented since tabs 60 abut an end face of groove 58. It should be understood that retainer 42 may be attached to outer race 26 in any order relative to the attachment of boot 34 to retainer 42, and the attachment of boot 34 to shaft 22.

Figure 3:
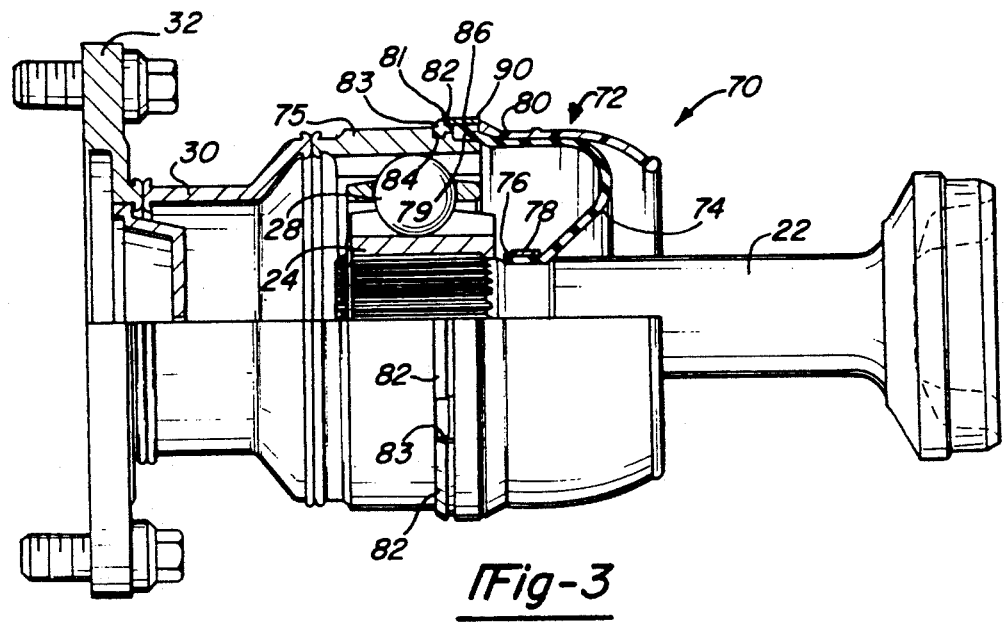
FIG. 3 is a partially cross-sectional view of a second embodiment of the present invention.

A second embodiment 70 is illustrated in FIG. 3. A boot assembly 72 includes a flexible boot 74 with a radially inner end 76 connected by clamp 78 to shaft 22. An outer race 75 has a tapered end 79 which receives a radially outer end 81 of boot 74. The radially inner peripheral surface of radially outer end 81 is tapered to conform to the shape of tapered end 79. A retainer 80 includes a plurality of circumferentially spaced fingers 82 extending axially forwardly of boot 74. Tabs 83 extend radially inwardly from an inner peripheral surface of fingers 82, and snap resiliently into a groove 84 formed at the outer peripheral surface of outer race 75. Tabs 83 are ramped to facilitate the insertion of retainer 80 onto the outer peripheral surface of outer race 75.

A plurality of flanges 86 extend radially outwardly of an outer peripheral surface of boot end 81. Slots are defined between adjacent fingers 82, and slot end faces 88 abut flanges 86, such that retainer 80 positions boot 74 at a fixed axial position on outer race 75. A clamp 90 is positioned radially outwardly of retainer 80 to secure retainer 80 and boot 74 to outer race 75.

Figure 4:
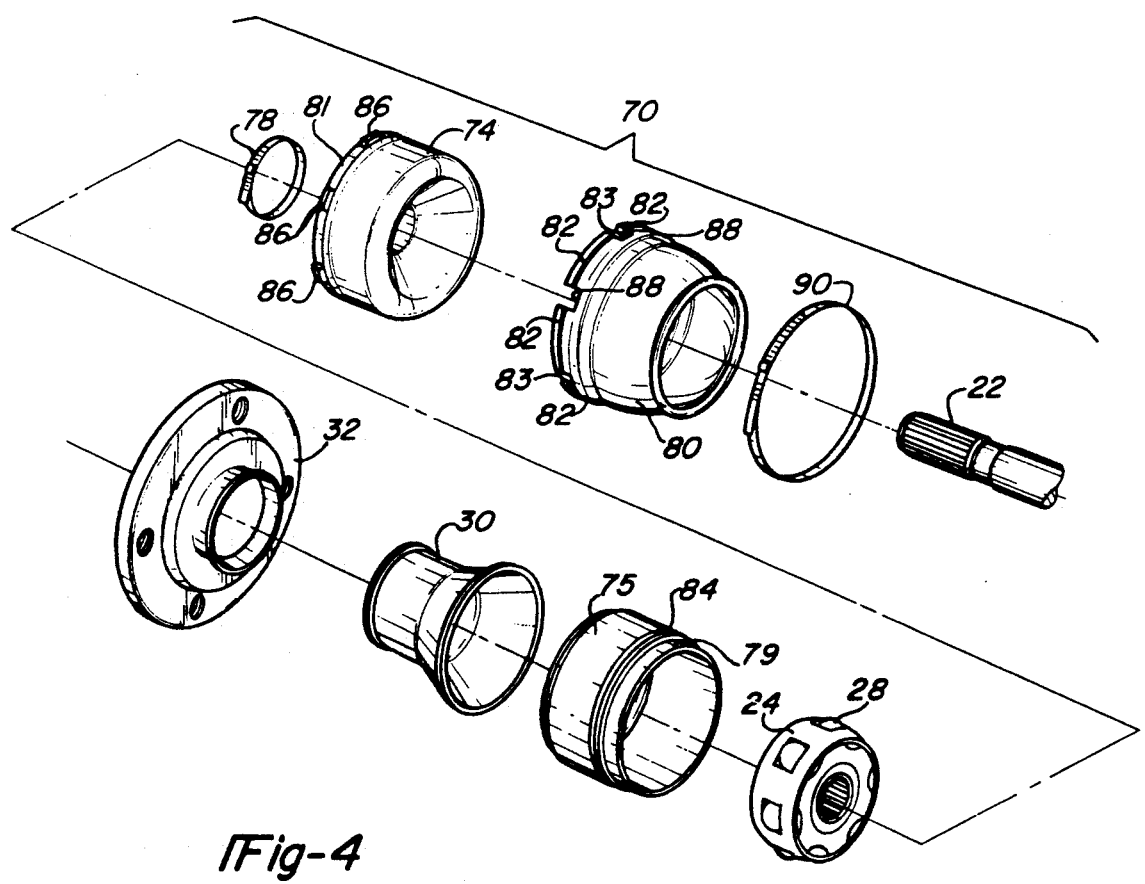
FIG. 4 is an assembly view of the embodiment illustrated in FIG. 3.

FIG. 4 shows further details of the embodiment 70 disclosed in FIG. 3. As shown, retainer 80 includes a plurality of fingers 82 which extend axially forwardly of slot end face 88. Slot end faces 88 are circumferentially aligned with flanges 86 on boot 74. Tabs 83 extend radially inwardly from inner peripheral surfaces of fingers 82.

When assembling boot assembly 72, radially inner end 76 of boot 74 is initially attached to shaft 22 by clamp 78. The retainer 80 is then aligned over boot 74, with slot end faces 88 abutting flanges 86. Retainer 80 and boot 74 are forced onto tapered end 79 of outer race 75 until tabs 83 snap into groove 84. Clamp 90 is then positioned radially outwardly of retainer 80, and secures boot assembly 72 on outer race 75.

Figure 5:
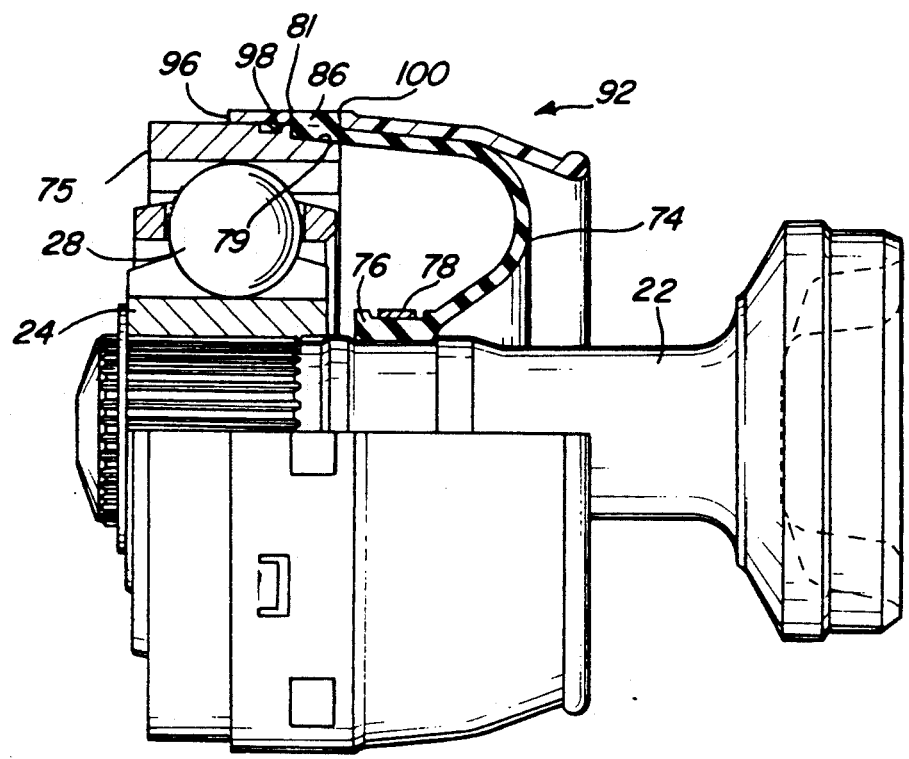
FIG. 5 is a partially cross-sectional view of a third embodiment of the present invention.

A third embodiment 92 is disclosed in FIG. 5. Third embodiment 92 differs from second embodiment 70 in the construction of retainer 94. Retainer 94 has a cylindrical axial end 96 which extends axially beyond groove 84. A plurality of circumferentially spaced, radially inwardly extending tabs 98 snap into groove 84. Tabs 98 are ramped. Retainer 94 is force fit onto outer race 76, and secures boot 74. Flanges 86 are formed at boot end 81. A plurality of flange tabs 100 extend radially inwardly from an inner peripheral surface of retainer 94 and abut flanges 86.

Figure 6:
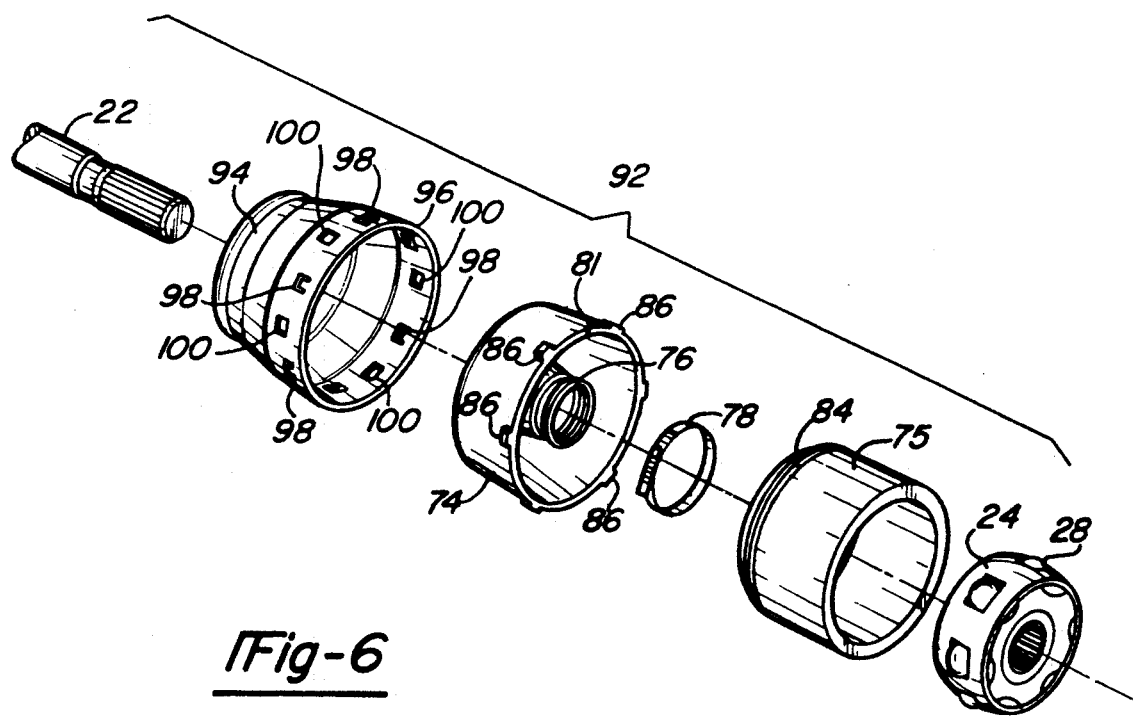
FIG. 6 is an assembly view of the embodiment illustrated in FIG. 5.

As shown in FIG. 6, tabs 98 are circumferentially spaced. Flange windows 100 are circumferentially spaced, and positioned between adjacent tabs 98.

Third embodiment 92 is assembled in a fashion similar to second embodiment 70. Flange windows 100 are radially aligned with flanges 86. Retainer 94 is force fit onto an outer peripheral surface of outer race 76. Tabs 98 snap into groove 84 securing retainer 94 and boot 74 on outer race 76.

In a preferred embodiment of the present invention, the relatively rigid retainers are formed of a nylon. Most preferably they are formed of a nylon available under the tradename ST-801. Nylon 66 may also be utilized. Alternatively, the retainer may be metallic. The boots are preferably formed of known neoprene materials.

Preferred embodiments of the present invention have been disclosed. A worker of ordinary skill in the art will appreciate, however, that certain modifications will come within the scope of this invention. For that reason, the following claims should be studied in order to determine the true scope and content of the invention.

I claim:

1. A constant velocity universal joint for transmitting rotation between a first and second shaft comprising:
   an inner race having a central axis and adapted to be connected to a first shaft, an outer race positioned radially outwardly of said inner race, said outer race being adapted for attachment to a second shaft, bearing elements being positioned between said inner and outer races;
   a retainer having an axially inner end extending axially along and radially outwardly of a portion of said outer race, said inner end of said retainer having an inner peripheral surface, at least one resilient tab extending radially inwardly from said inner peripheral surface, said outer race having an outer peripheral surface, and a groove formed at said outer peripheral surface, said tab being received in said groove, said groove being defined by a groove portion of said outer race outer peripheral surface spaced from said central axis by a first distance, said outer race outer peripheral surface having land portions adjacent to said groove, and on each axial side of said groove, with said land portions on each axial side of said groove being spaced from said central axis by a distance which is greater than said first distance, said retainer having an axially outer end spaced axially away from said outer race, said at least one tab being positioned between said axially inner end and said axially outer end; and
   a flexible boot having a radially inner end adapted for attachment to the first shaft, and having a radially outer end attached to said retainer and at a position such that the entirety of said radially outer end is spaced axially away from said outer race, said retainer securing said radially outer end of said boot at a generally fixed axial position relative to said outer race.

2. A joint as recited in claim 1, wherein said boot radially outer end is attached to said axially outer end of said retainer, said axially outer end of said retainer including a generally U-shaped notch, said boot radially outer end being received in said U-shaped notch, and securing means securing said boot radially outer end in said U-shaped notch.

3. A joint as recited in claim 2, wherein said securing means includes a ring which is force fit into an inner peripheral surface of said radially outer end of said boot.

4. A joint as recited in claim 1, wherein said outer race having an axial end face, said retainer has an abutting face intermediate said inner and outer ends which abuts said axial end face of said outer race, said retainer extending axially towards said inner end from said abutting end face, and said at least one tab being positioned between said abutting face and said inner end.

5. A joint as recited in claim 4, wherein said inner end of said retainer is generally cylindrical, and there are a plurality of said tabs extending radially inwardly from said inner peripheral surface of said retainer at circumferentially spaced locations.

6. A joint as recited in claim 5, wherein said plurality of tabs extend between first and second tab ends, said tabs are ramped and extend from said first tab end radially inwardly to said second tab end which is spaced axially outwardly of said first tab end.

7. A joint as recited in claim 4, wherein a seal is disposed between said abutting face and said end face of said outer race.

8. A joint as recited in claim 7, wherein a clamp is included, said boot inner radial end is adapted to be attached to the first shaft by said clamp at a side of said boot facing axially away from said outer race.

9. A joint as recited in claim 1, wherein there are a plurality of said tabs extending radially inwardly from said inner peripheral surface of said retainer at circumferentially spaced locations.

10. A joint as recited in claim 1, wherein said at least one tab extends between first and second tab ends, said tab is ramped and extends from said first tab end radially inwardly to said second tab end which is spaced axially outwardly of said first tab end.

11. A constant velocity universal joint comprising:
an inner race having a central axis and adapted to be connected to a first shaft, an outer race positioned radially outwardly of said inner race and being adapted to be connected to a second shaft, bearing elements being positioned between said inner and outer races; and
a flexible boot having a radially inner end adapted for attachment to the first shaft, and a retainer member, said boot having a radially outer end positioned by said retainer member, said retainer member extending axially along, and radially outwardly of a portion of said outer race, said retainer member having an inner peripheral surface, a plurality of circumferentially spaced resilient tabs extending radially inwardly from said inner peripheral surface of said retainer member, said outer race having an outer peripheral surface and a cylindrical groove formed at said outer peripheral surface, said groove being defined by a groove portion of said outer race outer peripheral surface spaced from said central axis by a first distance, said outer race outer peripheral surface having land portions adjacent to said groove, and on each axial side of said groove, with said land portions on each axial side of said groove being spaced from said central axis by a distance which is greater than said first distance, and said resilient tabs being received in said cylindrical groove.

12. A joint as recited in claim 11, wherein said boot radially outer end also extends axially along, and radially outwardly of, said outer race portion, said boot having an axially innermost position of said radially outer end of said boot, and said retainer is positioned radially outwardly of said radially outer end of said boot, said tabs positioned axially inwardly of said axially innermost position of said radially outer end of said boot.

13. A joint as recited in claim 12, wherein a clamp is positioned radially outwardly of said retainer to secure said retainer and said boot to said outer race.

14. A joint as recited in claim 12, wherein said retainer is forced fit onto said outer race to secure said retainer and said boot to said outer race.

15. A joint as recited in claim 12, wherein said boot includes a boot outer peripheral surface, a plurality of radially outwardly extending flanges which are circumferentially spaced about said boot outer peripheral surface, and said retainer has portions which abut said flanges, said tabs being at positions spaced axially inwardly of said flanges.

16. A joint as recited in claim 12, wherein said outer peripheral surface of said outer race is tapered adjacent an end face.

* * * * *